United States Patent [19]

Sjöström

[11] Patent Number: 5,337,864
[45] Date of Patent: Aug. 16, 1994

[54] SUSPENSION SYSTEM WITH IMPROVED RESONANCE DAMPING AND A METHOD FOR REGULATING THE SUSPENSION SYSTEM

[75] Inventor: Sverker Sjöström, Grödinge, Sweden

[73] Assignee: Saab-Scanig Aktiebolag, Sweden

[21] Appl. No.: 983,598

[22] PCT Filed: Aug. 9, 1991

[86] PCT No.: PCT/SE91/00527

§ 371 Date: Feb. 8, 1993

§ 102(e) Date: Feb. 8, 1993

[87] PCT Pub. No.: WO92/02382

PCT Pub. Date: Feb. 20, 1992

[30] Foreign Application Priority Data

Aug. 10, 1990 [SE] Sweden ................................ 9002615

[51] Int. Cl.$^5$ .................. B60G 17/08; F16F 9/50
[52] U.S. Cl. .................................. 188/378; 188/299; 188/316; 188/318; 267/136; 267/221; 267/225; 280/707
[58] Field of Search .............. 188/299, 378, 379, 380, 188/316, 318, 312; 267/136, 221, 225; 280/707, 666, 685, 696, 701, 724; 248/550, 559

[56] References Cited

U.S. PATENT DOCUMENTS

| | | | |
|---|---|---|---|
| 4,154,461 | 5/1979 | Schnittger | 267/225 X |
| 4,685,698 | 8/1987 | Klinkner et al. | 188/299 X |
| 4,869,474 | 9/1989 | Best et al. | 267/136 |
| 4,887,699 | 12/1989 | Ivers et al. | 267/221 X |
| 4,909,535 | 3/1990 | Clark et al. | . |
| 4,986,393 | 1/1991 | Preukschat et al. | 188/318 |
| 5,096,168 | 3/1992 | Takehara et al. | 267/225 X |

FOREIGN PATENT DOCUMENTS

| | | |
|---|---|---|
| 270893 | 6/1988 | European Pat. Off. . |
| 3631876 | 9/1986 | Fed. Rep. of Germany . |
| 461140 | 1/1990 | World Int. Prop. O. . |

OTHER PUBLICATIONS

Patent Abstracts of Japan, vol. 9, No. 38, M358, abstract of JP 59-179413, publ 1984-10-12 (Sanw Seiki K.K.).
Patent Abstracts of Japan, vol. 11, No. 14, M553, abstract of of JP61-189335, publ 1986-08-23 (Koganei Seisakusho K.K.).

*Primary Examiner*—Douglas C. Butler
*Attorney, Agent, or Firm*—Ostrolenk, Faber, Gerb & Soffen

[57] ABSTRACT

A suspension system for motor vehicles is disposed between body (1) and wheel (2) and is provided with a damper (4) with integrated resonance dampers (40, 48) for improved insulation of transmission of road unevenness to the body. The resonance damper is formed in that the casing (40) of the damper (4) forms a moving mass $m_{40}$ between the body (1) and the wheel (2), the casing being connected to the wheel via a spring (48) harmonized with the mass $m_{40}$. The pistons (41, 42) of the damper are connected via piston rods (43, 44, respectively) to the body (1) and the wheel (2), respectively. By a fixed adaptively regulated flow between the chambers (5—7) formed in the damper (4) in response to parameters dependent upon the oscillation cycle, there will be obtained improved insulation primarily in those resonance ranges which are typical for suspension systems for motor vehicles,

39 Claims, 6 Drawing Sheets

SUSPENSION SYSTEM WITH IMPROVED RESONANCE DAMPING AND A METHOD FOR REGULATING THE SUSPENSION SYSTEM

The present invention relates to a suspension system with improved resonance and a method for regulating the suspension system. The suspension system is primarily employed as a spring system between body and wheel in motor vehicles which typically display two resonance ranges caused, in the one case, by the mass of the body and the main spring of the suspension system, and, in the second case, by the mass of the wheels and the spring action of the tyre.

BACKGROUND ART

In suspension systems between vehicle bodies and the wheels of the vehicle, use is conventionally made of a suspension system provided for each wheel and consisting of a spring and a shock absorber—or damper—connected in parallel between body and wheel.

The body forms a first mass which is to be sprung, and the wheel, which comprises tyre and hub, forms a second mass which is considered as an unsprung mass. However, the wheel does possess a certain springing in the tyre, but in this context is designated as the unsprung mass.

The suspension system is intended to damp the transmission of road unevenness to the body and, at the same time, ensure that the tyre abuts against the road surface for retaining road-holding properties. These objects are in conflict with one another, and so conventional suspension systems are designed for the best possible compromise between these properties.

Two resonance ranges are critical for such suspension systems. In a first resonance range, the body will assume a state of resonance if the disturbing frequency lies typically within 0.8–4 Hertz (Hz), normally about 1 Hz. In this first resonance range, insulation of disturbing impulses from the road surface or carriageway is impeded. In a second resonance range, the wheel will assume a state of resonance if the disturbing frequency lies typically within 10–15 Hz, normally about 10 Hz. Insulation of the disturbing impulses of the road surface and road-holding properties also deteriorate in this resonance range.

The damper is intended to reduce those disturbing impulses which are transmitted to the body in these resonance ranges. However, the choice of a fixed, so-called passive damping constitutes a compromise between, on the one hand, increasing transmission of disturbing frequencies outside of the resonance range With reduced resonance oscillation as a consequence, and, on the other hand, reduced transmission of disturbing frequencies outside of the resonance range, with increased resonance oscillation as a result. For example, relatively hard damping may damp the natural resonance of the body, while disturbing frequencies outside the resonance range will have increased transmission. Conversely, a gentler damping will provide satisfactory damping of disturbing frequencies outside the resonance range. While the body or the wheel will more readily assume a state of powerful resonance. In disturbing frequencies within each respective resonance range.

In order further to improve suspension systems, both semiactive and active suspension systems have been proposed in the art. A feature of the semiactive suspension systems is that the damping in the dampers is modified in response to the direction and amplitude of the disturbing frequency, without any external energy being supplied to the damping operation. According to the active systems, external energy is supplied to the damping work in response to the direction and amplitude of the disturbing frequency, and possibly also related to the distance between the body and the wheel.

Both the semiactive and the active suspension systems have hitherto demonstrated that the transmission of disturbing impulses within the resonance ranges, in particular the resonance range of the wheel, has been excessively high. In order that the active suspension systems at least theoretically be capable of giving low transmission within the resonance range of the wheel, extremely complex steering systems with advanced transducers and indicators of high resolution have been necessary.

There are prior art solutions for governing the natural resonance of the wheel, so-called "wheel-hop". For example, Patent Application DE,A, 2217539 discloses a damping mass connected to the wheel and controlled in response to the movement of the wheel and the effect of the suspension system, the damper and the spring. A similar solution is disclosed in Patent Application EP-,A,-200384 and may also be found reproduced as a principle in the Annual publication "Bosch Kraftfahrtechniches Taschenbuch" in the section "Federung". Common to all of these solutions ms that the resonance damping mass is included in a system which is parallel with and discrete from the damper and the spring, whereby considerable space must be reserved for this system for damping of wheel-hop.

OBJECTS OF THE INVENTION

The present invention has for its object to realise a suspension system which is simplified from the point of view of regulation and is reduced to a minimum from the parent of view of space, with improved insulation at disturbing impulses from the road surface also within the resonance ranges typical for the suspension system.

A further advantage afforded by the suspension system according to the present invention is that it may be employed in not only passive and semiactive, but also active damping of the damping function of the main damper on the movement between body and wheel, as well as in different combinations with passive, semiactive or active damping of wheel-hop.

The suspension system according to the present invention also advantageously employs simplified laws of regulation for optimum suspension, which entails that only the distance between body and wheel need be detected for controlling the damping operation outside of the resonance range of the wheel, and treat the resonance damping function about the wheel-hop frequency may be effected under passive or semiactive/active control by means of an accelerometer disposed on the wheel or alternatively by means of a road surface sensor disposed on the body.

To this end, the suspension system according to the present invention is disposed between a first sprung mass and a second unsprung mass for reducing the transfer of disturbing impulses from the second unsprung mass to the first unsprung mass. The suspension system includes first spring means for resiliently connecting the first and second masses in a force transmitting relationship. A damping cylinder having a casing is connected in parallel with the first spring means between the first and second masses. Second spring means are provided for resiliently interconnecting the casing of the damping cylinder with the second unsprung mass. The damping cylinder includes first and second pistons connected with the first and second masses, respectively by means of piston rods. The pistons divide the cylinder into first, second and third chambers, each of which accommodates a damping fluid. Flow actuating means are provided for controlling the flow of damping fluid into and out of each chamber. The method of the present invention is characterized in that the first and second pistons are utilized for transmitting the movement of the first sprung mass and the second unsprung mass to the damping cylinder and that the casing of the damping cylinder is utilized as a resonance damping mass for damping movement of the unsprung mass.

Other characterising features and advantages will be apparent from the appended claims and the following description of the embodiments of the suspension system according to the present invention and the method for regulating the suspension system. The description is made with reference to the accompanying Drawings.

DESCRIPTION OF ONE EMBODIMENT

Figure 1:
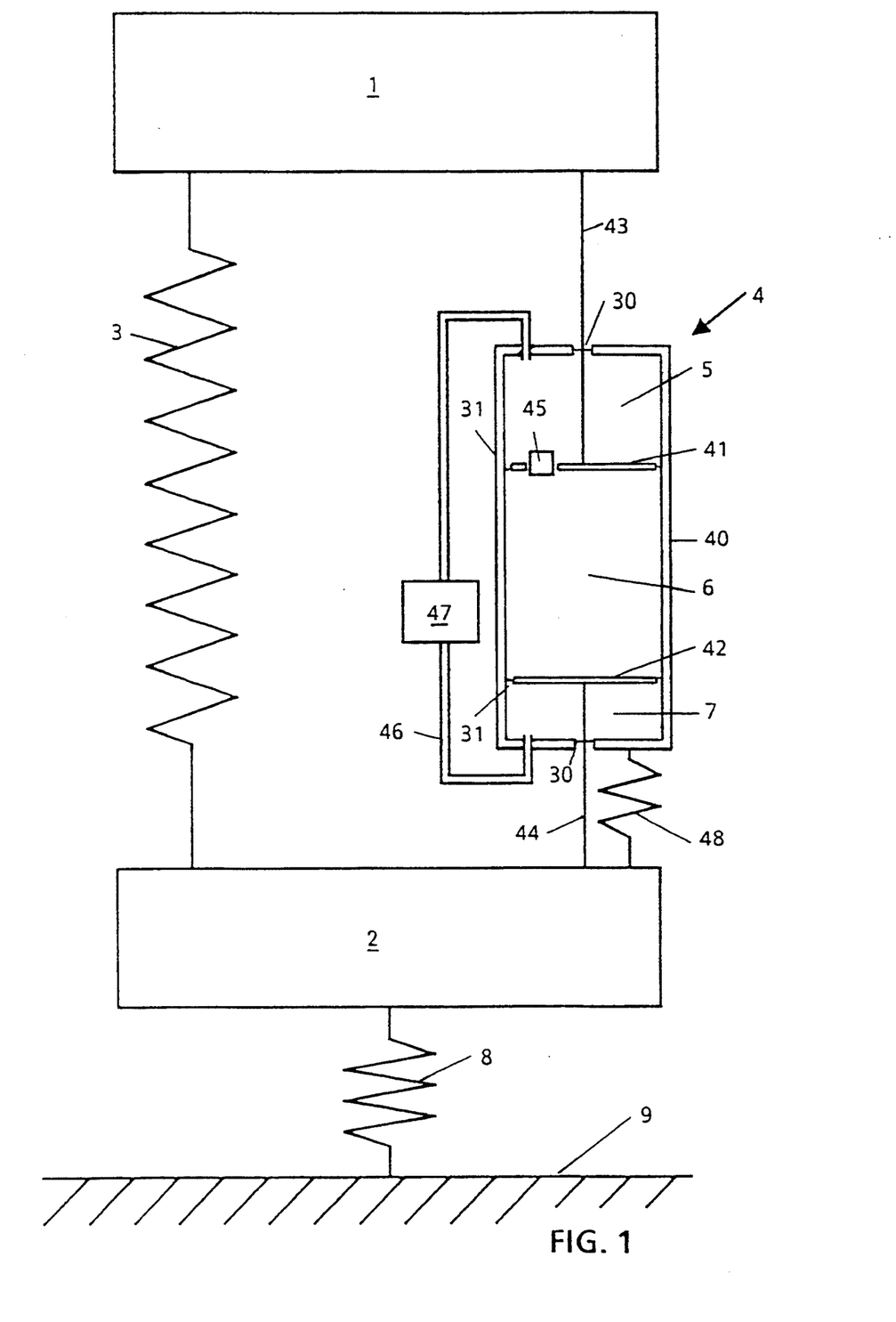
FIG. 1 shows a suspension system in which the damper damps passively.

Referring to the Drawings, FIG. 1 shows a suspension system according to the present invention disposed between a first mass 1 and a second mass 2. The suspension system is operative to damp the transmission of the movement of the second mass 2 to the first mass 1, for which reason the first mass 1 is designated the sprung mass 1 and the second mass 2 is designated the unsprung mass 2. In vehicular contexts, the body and those parts of the vehicle which are substantially rigidly connected to the body constitute the first sprung mass 1, while the unsprung second mass 2 consists of each respective tyre and wheel hub of the vehicle, The term wheel hub is taken to signify those parts in the wheel which, in the springing movement of the wheel in relation to the body, accompany the wheel in its movement.

The primary suspension system conventionally consists of a passive spring member 3 and a shock-absorber or damper 4 connected in parallel with the spring member 3 and disposed between the body—the sprung mass 1—and each one of the wheels—the unsprung masses 2. One of the purposes of the damper is to damp the resonance which the primary suspension system can assume when the disturbance frequency from the road surface coincides with the natural resonance frequency of the primary system, which, for vehicles, lies in the range of between 0.8 and 4 Hz. The unsprung mass 2 has its own spring characteristics since the wheel in itself acts as a spring 8 which entails that the wheel has a resonance frequency which differs from that of the primary suspension system and typically lies within the range of between 10 and 15 Hz. The damper also serves the purpose of damping this natural resonance of the wheel, so-called wheel-hop.

The suspension system according to the present invention includes, in the embodiment illustrated in FIG. 1, a damper 4 whose casing 40 forms a resonance mass which is movable between the body 1 and the wheel 2 and is connected to the wheel 2 by the intermediary of a spring member 48. Only the upper piston 41 adjacent the body and the lower piston 42 in the damper 4 are directly and rigidly connected to the body 1 and the wheel 2, respectively, by the intermediary of piston rods 43, 44. The pistons 41 and 42 run, sealed by sealings 31, against the preferably cylindrical circumferential surface of the damper casing 40, while the passages of the piston rods 43 and 44 in the damper casing 40 are sealed by seals 30 disposed in the passages of the casing 40. The upper chamber 5 of the damper and its lower chamber 7 are connected by a channel 46 in which a throttle valve 47 is disposed for damping the flow between the upper chamber 5 and the lower chamber 7. Hereby, the casing 40 of the damper 4 with a mass $m_{40}$ may be utilised as resonance damping mass for damping the natural resonance of the wheel. By adapting the spring constant $k_{48}$ of the spring member 48 and the mass $m_{40}$ of the casing 40 to the spring constant $k_8$ of the wheel 2 and the mass $m_2$ of the wheel 2 so that $k_{48}/m_{40}=k_8/m_2$, resonance damping of wheel-hop will be obtained. There will thus be attained, with a fixed damping of the throttle valve 47, a passively harmonised resonance damper against wheel-hop. For damping of the movement between body 1 and wheel 2, the upper piston 41 is provided with a throttle valve 45 which, in flow terms, communicates the upper chamber 5 with the centre chamber 6. With a fixed throttling in the throttle valve 45, there will be obtained a passive conventional damping of this movement.

Figure 2:
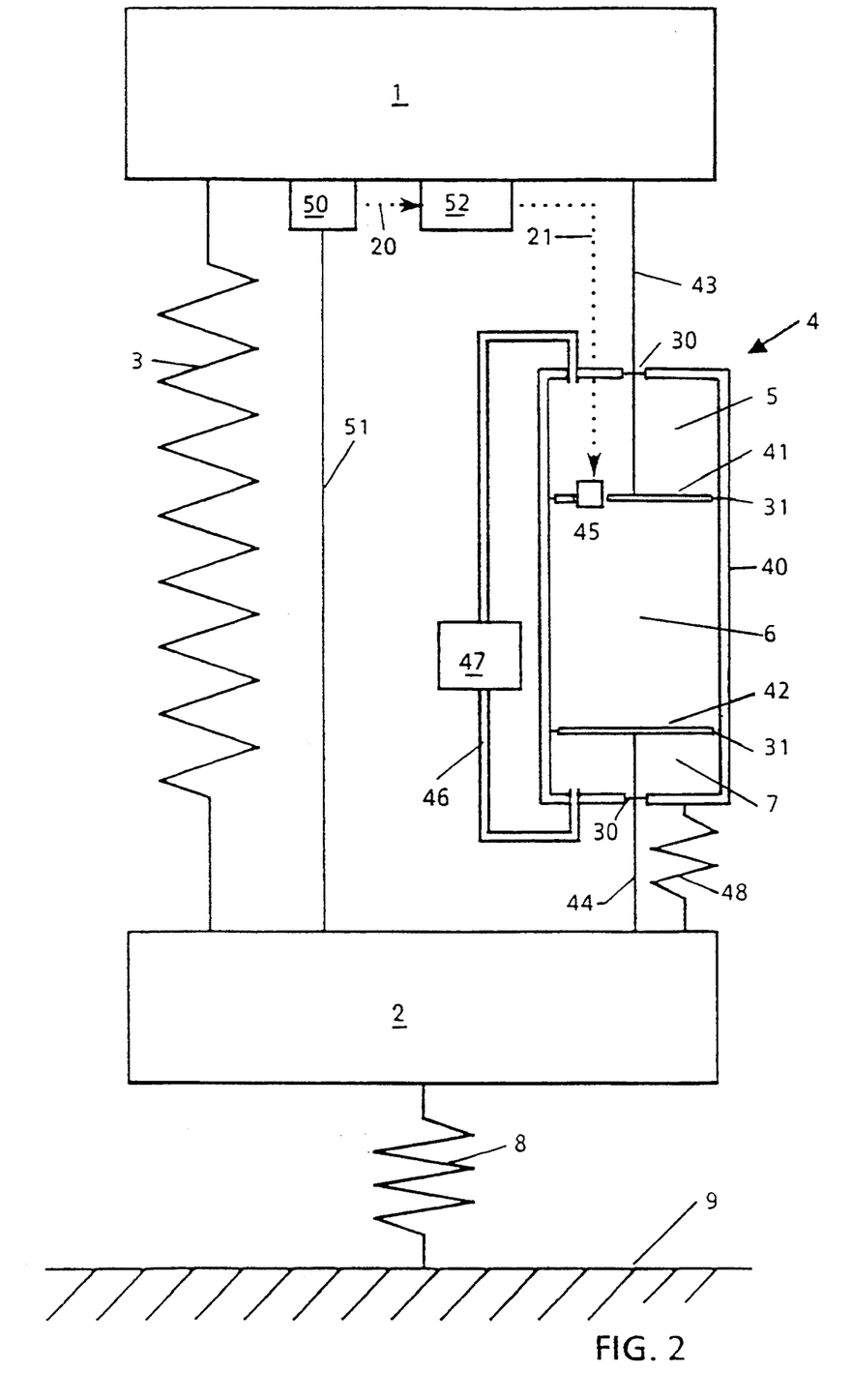
FIG. 2 shows a suspension system in which the damper is regulated semiactively in respect of the movement between sprung and unsprung mass and in which the damper is regulated passively, harmonised with the resonance of the unsprung mass.

In a second alternative embodiment illustrated in FIG. 2, the damping of the damper 4 can be controlled semiactively in respect of the movement between body 1 and wheel 2, the casing 40 of the damper 4 forming a passively harmonised resonance mass against wheel-hop. In order to control the damper semiactively, use is made of a movement detector 50 which is connected substantially parallel with the spring 3 and the damper 4, or a corresponding springing movement for the wheel 2, between the body 1 and the wheel 2. The movement detector may detect compression of the spring 3 and emit a signal on a signal line 20, shown by dotted lines in the Drawing, to a control unit 52. The signal represents the relative position and relative speed between body 1 and wheel 2.

The movement detector may possibly consist of a transducer according to Patent Application SE,A, 8903787-3. This transducer includes a cable 51 which is wound with a plurality of turns onto a rotary cable magazine or drum. One end of the cable is secured in the cable magazine and the cable is withdrawable against spring action from the rotary cable magazine in the detector, which in itself is permanently secured to the body, and in which the other end of the cable 51 is fixedly anchored in the wheel 2. Using a specific pulse code disc rotating with the cable magazine which generates a pulse train, a pulse evaluation circuit can give both the position and the direction of the movement. There will hereby be lo obtained the necessary control parameters for the semiactive control. The throttle valve 45 may hereby be controlled by the output signal 52 of the control unit by the intermediary of the control signal line 21 in dependence upon the value of the control parameters between different damping levels, which gives a semiactive damping.

Figure 3:
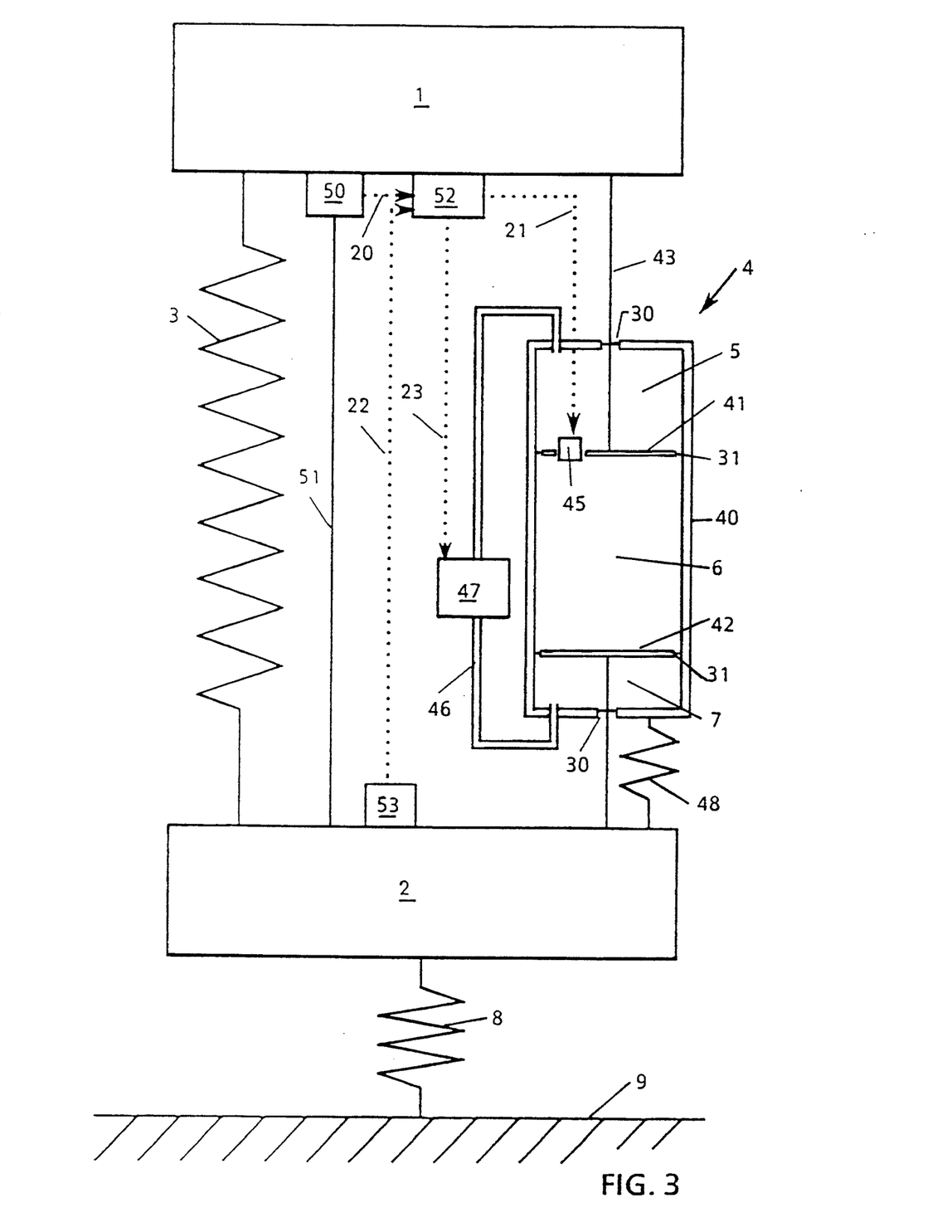
FIG. 3 shows a suspension system in which the damper is regulated semiactively in respect of the movement between sprung and unsprung mass and the resonance of the unsprung mass.

In a third alternative embodiment illustrated in FIG. 3, the movement of the resonance mass, the casing 40, may also be controlled semiactively in dependence upon the vertical speed of the wheel. In order to control the movement of the damper casing 40, use is made of a movement sensor 53 disposed on the wheel. The sensor 53 suitably consists of an accelerometer which detects the vertical acceleration of the wheel 2 substantially parallel with the damper 4, or a corresponding springing movement for the wheel, and which, via the signal line 22, gives a signal proportional to the acceleration to the control unit 52. The control unit 52 integrates the signal and can hereby control, in dependence upon the vertical speed of the wheel, an adjustable throttle valve 47 in the communication conduit 46 between the upper chamber 5 and the lower chamber 7. Hereby, a semiactive damping of both wheel-hop and the movement between body and wheel can be realised. As an alternative to the accelerometer 53, a road surface sensor (not shown) may instead be employed in vehicular applications. The road surface sensor is then ideally disposed on the body and detects unevenness in the road surface 9, controlling damping in response thereto. The road surface sensor may be of a type with combined transmitter and receiver fixedly mounted on the body and which, by distance measurement between the body and the road surface, detects unevenness in the road surface ahead of the vehicle. The distance measurement may, for instance, be effected in a per se known manner by the emission of either radio, sonic or optic waves from the transmitter and detecting, with the receiver, the time-lag for the waves reflected against the road surface. A road surface sensor affords certain advantages in that its regulation can be prearranged and be effected more rapidly before the disturbance, the road surface unevenness, is transmitted to the wheel.

Figure 4:
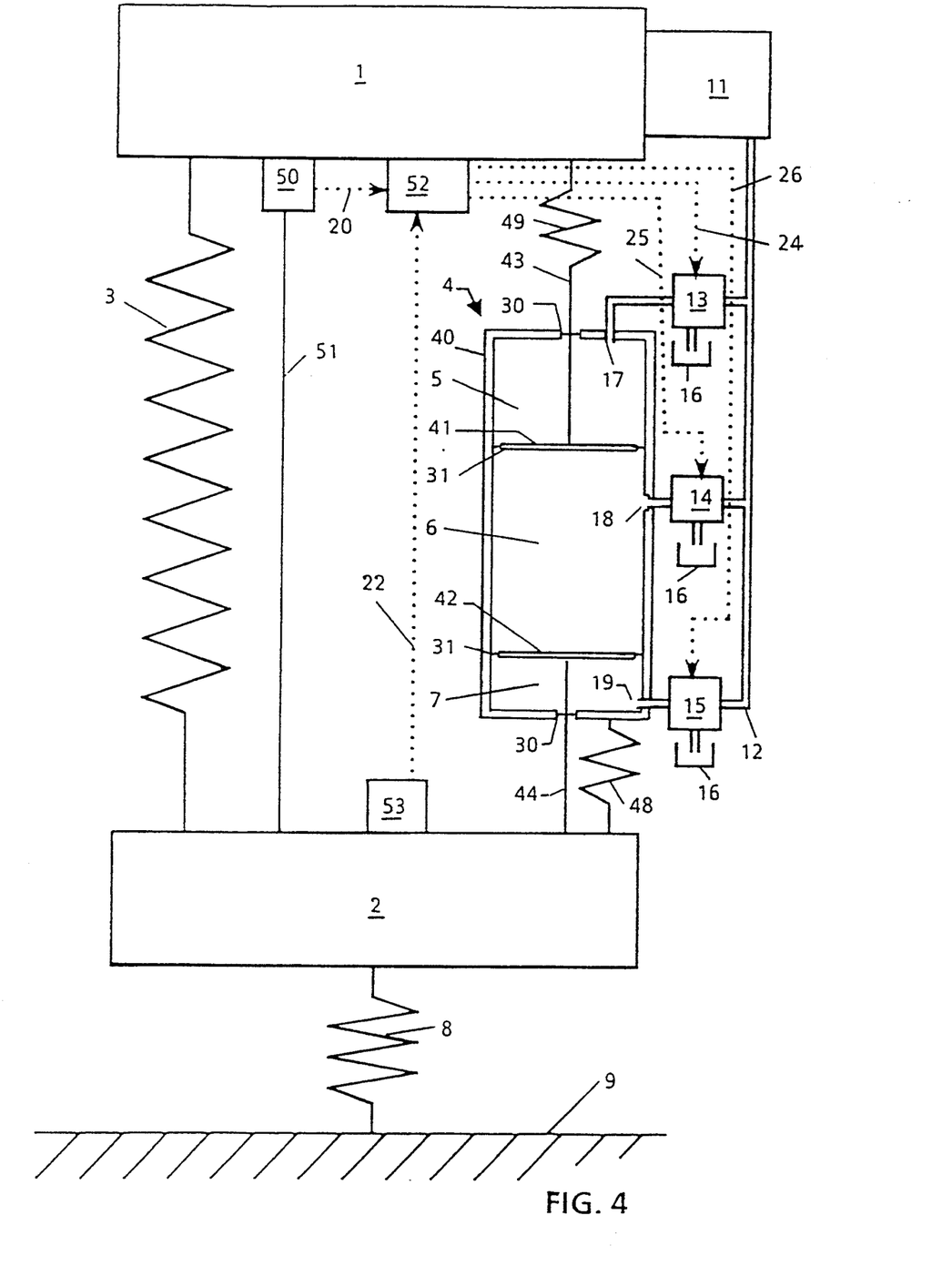
FIG. 4 shows a suspension system in which the damper is regulated actively in respect of the movement between sprung and unsprung mass and the resonance of the unsprung mass.

In a fourth alternative embodiment illustrated in FIG. 4, the damper can be controlled fully actively, hence with external energy supply to the damping work in respect of both wheel-hop and the movement between body and wheel. The fully active damper 4 in FIG. 4 differs in terms of design in relation to the embodiment illustrated in FIG. 3 inasmuch as the chambers 5–7 of the damper 4 may be pressurised or evacuated, operated independently of one another by regulator valves 13–15. In order to pressurise the chambers 5–7, there is a pressure source 11 suitably provided at the body 1, the pressure source 11 leading, via a preferably common pressure supply conduit 12, pressurised damping fluid to each respective regulator valve 13–15. The chamber 5–7 may also be evacuated through the regulator valves 13–15 to a reservoir 16. The reservoir 16 may suitably be common to all regulator valves 13–15 and be disposed adjacent the pressure source 11, but is represented in FIG. 4 as three separate reservoirs. For purposes of more readily being able to regulate the operating cycle, the piston rod 43 of the upper piston 41 is also provided with a spring member 49. The alternating function of the regulator valves between pressurisation and evacuation is controlled by the control unit in response to the control parameters given by the sensors 50 and 53.

The spring member 3 illustrated in FIGS. 1–4 need not necessarily, in a vehicular application, consist of a conventional coil spring allocated to each wheel, but may, with equivalent effect, be replaced by other types of spring means, for example torsion springs allocated wheels on either side of the vehicle disposed on an axle- Nor need the damper, like the spring member, be disposed in parallel with the substantially vertical spring movement of the wheel, but may be physically arranged at an angle to the spring movement while functionally aging on the substantially vertical spring movement.

Figure 5:
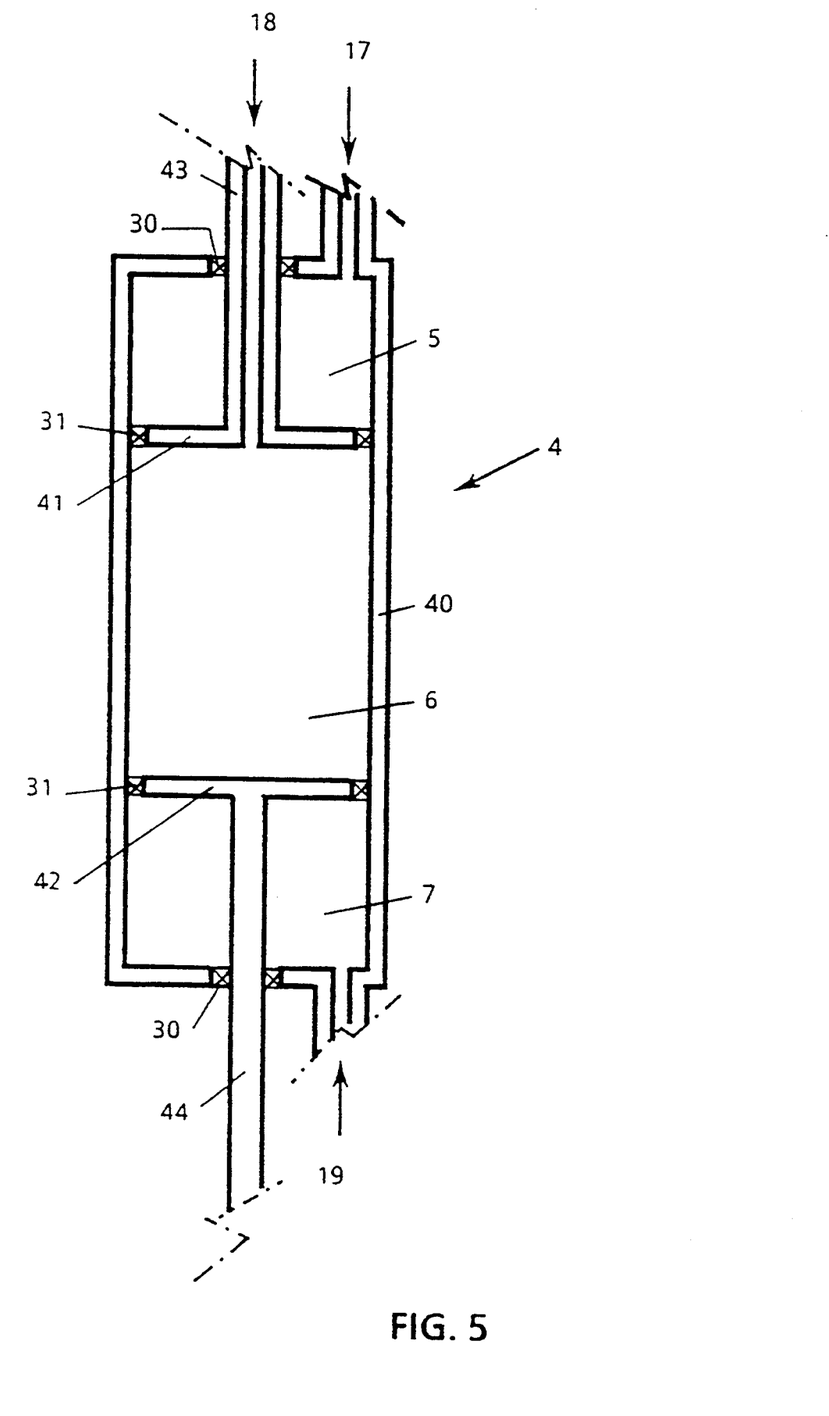
FIG. 5 shows an alternative damper design for active control.

FIG. 5 shows an alternative inlet and outlet configuration 17–19 to the chambers 5–7 of the damper 4. Here, use is made of the upper piston rod 3 as regulator channel 18 to the centre chamber 6, in that the piston rod 43 is tubular and discharges between the pistons. The regulator channels 17 and 19 for the upper and lower chamber, respectively, are both disposed to discharge in the end walls of the damper 4. Otherwise, the damper corresponds in terms of design to the parts indicated in FIGS. 1–4.

Figure 6:
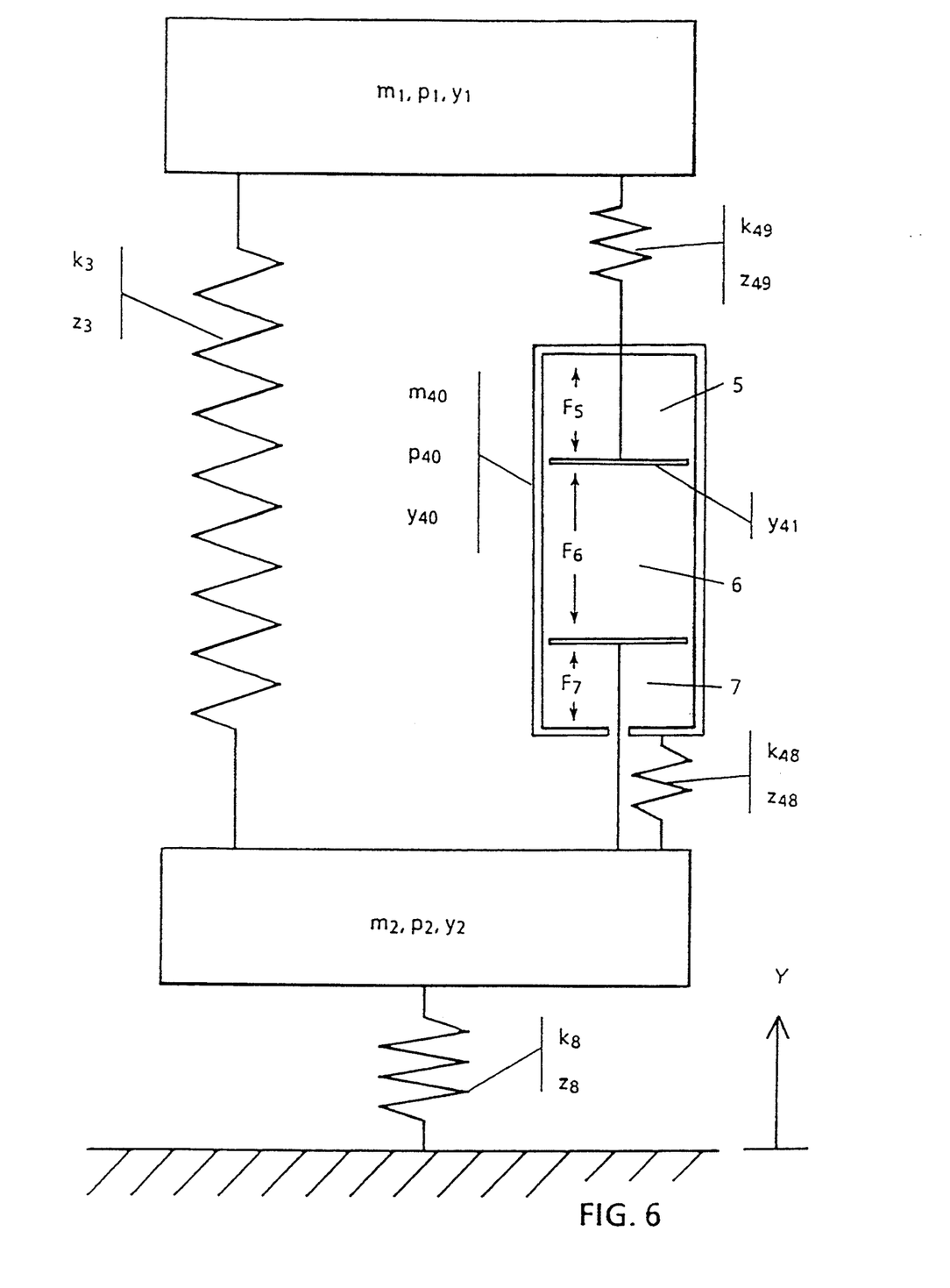
FIG. 6 shows the parameter designations associated with the components and employed for deriving the operative laws.

For deriving the operative laws, use is made of the parameter designations applied in FIG. 6 for the different components. For an optimum active suspension, a first relationship (1) for the compression z as a function of the position y for the spring components 49, 3, 8, 48 and the external disturbing function, the road surface unevenness, Y can be posited:

$$z_{49} = y_{41} - y_1$$

$$z_3 = y_2 - y_1$$

$$z_8 = y - y_2 \qquad (1)$$

$$z_{48} = y_2 - y_{40}$$

and a second relationship (2) for the momenta p of the masses 1, 2, 40 as a function of the masses m and the speeds y°, where y° represents the time derivates dy/dt of the positions y:

$$p_1 = m_1 {}^* y°_1$$

$$p_2 = m_2 {}^* y°_2 \qquad (2)$$

$$p_{40} = m_{40} {}^* y°_{40}$$

Hereinafter, the designation x° will be employed for the first time derivate dx/dt of a parameter x, and the designation x°° for the second time derivate $dx^2/d^2t$ of the parameter x, and so on.

By introducing the actuator forces F in each respective chamber 5, 6 and 7, the movement equations will be obtained for the system with the spring constants of the spring components designated k:

$$p°_1 = k_3 {}^* z_3 + F_6 - F_5$$

$$p°_2 = -k_3 {}^* z_3 + k_8 {}^* z_8 - k_{48} {}^* z_{48} - F_6 + F_7 \qquad (3)$$

$$p°_{40} = k_{48} {}^* z_{48} + F_5 - F_7$$

With a net force on the upper piston 41 which counteracts the action of the main spring 3 on the body 1, and a net force on the damper casing 40 which counteracts the transmission by the wheel 2 of the disturbance Y, the following operative laws will be obtained:

$$F_5 - F_6 = k_3 * z_3 \tag{4}$$

$$F_5 - F_7 = -k_{48} * z_{48} - m_2 * Y^{\circ\circ}$$

alternatively, the second equation may be expressed as $$F_5 - F_7 = -k_{48} * z_{48} - m_2 * y^{\circ\circ}{}_2$$

Entry of the laws (4) in the movement equations (3) gives, using the relationships (1) and (2), the following simple solution:

$$y_1 = 0$$

$$y_2 = Y \tag{5}$$

$$y_{40} = -(m_2/m_{40})*y_2, \text{ or alternatively} = -(m_2/m_{40})*Y$$

The body movement $y_1$ will be 0, the wheel follows the road surface and the damper casing 40 is resonant in dependence on the mass relationship $m_2/m_{40}$ and the disturbance function Y.

A suitable choice of actuator forces in which a constant actuator force $F_0$ has been applied may be:

$$F_5 = F_0$$

$$F_6 = F_0 - k_3 * z_3 \tag{6}$$

$$F_7 = F_0 + k_{48} * z_{48} + m_2 * Y^{\circ\circ}$$

alternatively, the actuator force $F_7$ may be signified as $$F_7 = F_0 + k_{48} * z_{48} + m_2 * y^{\circ\circ}{}_2$$

The equations (6) thereby satisfy the operative laws an (4).

If the compression of the damper chamber 6 is designated $z_A$, there will be obtained, with the aid of the first operative law (4)

$$k_{49} * z_{49} = -k_3 * z_3 = k_{49} * (y_{41} - y_1)$$

$$z_A = y_2 - y_{41}$$

This then gives:

$$z_A = (1 + (k_3/k_{49})) * z_3 \tag{7}$$

Compression of the damper chamber 7 will then be $-z_{48}$ which is $y_{40} - y_2$ and, according to solution (5), there will then be obtained:

$$z_{48} = ((m_2/m_{40}) + 1) * y_2 = ((m_2/m_{40}) + 1) * Y \tag{8}$$

In order more readily to be able to govern the damper, or the actuator as it may be referred to in its active application, it has been proposed in the art that actuator speed be employed as a control parameter, since this actuator speed will substantially be proportional to the regulating current with which the regulator valves are to be controlled. In order to produce this actuator speed/control parameter, $z_A$ and $z_{48}$ are suitably derived in the equations (7) and (8) so that control parameters $z^{\circ}{}_A$ and $z^{\circ}{}_{48}$ are obtained:

$$z^{\circ}{}_A = (1 + (k_3/k_{49})) * z^{\circ}{}_3 \tag{9}$$

and $$z^{\circ}{}_{48} = ((m_2/m_{40}) + 1) * y^{\circ}{}_2 \tag{10}$$

or alternatively $$z^{\circ}{}_{48} = ((m_2/m_{40}) + 1) * Y^{\circ}$$

The control parameter $z^{\circ}{}_3$ is measured within the disturbance frequency range about $\omega = \omega_1$, corresponding to the natural resonance of the primary system where $(\omega_1)^2 = k_3/m_1$, and $y^{\circ}{}_2$ or $Y^{\circ}$ is measured about $\omega = \omega_2$, corresponding to the natural resonance frequency of the wheel where $(\omega_2)^2 = k_8/m_2$.

The variations in the pressure in the damper chamber/actuator volume 7 may then be written:

$$F_7 - F_0 = k_{48} * z_{48} + m_2 * Y^{\circ\circ} = k_{48} * ((m_2/m_{40}) + 1) * Y + m_2 * Y^{\circ\circ}$$

If the disturbance function Y can be allocated a harmonic function:

$Y = Y_0 * e^{i\omega t}$, will be obtained:

$$F_7 - F_0 = (k_{48} * (m_2/m_{40} + 1) - m_2 * \omega^2) * Y_0 * e^{i\omega t}$$

By selecting $k_{48}$ such that:

$$k_{48}/m_{40} = k_8/m_2 = (\omega_2)^2$$

there will the be obtained:

$$F_7 - F_0 = (1 + m_{40}/m_2 - (\omega/\omega_2)^2) * k_8 * Y_0 * e^{i\omega t}$$

When $m_2$ is substantially greater than $m_{40}$, minor variations will be obtained in $F_7$ within the interesting frequency range about $\omega = \omega_2$, the natural resonance frequency of the wheel, which saves the requisite addition of energy for an active damping function. However, it is a matter of expediency to manage this part of the frequency range semiactively, i.e. to damp when the relative position of the compression $z_{48}$ and relative speed $z^{\circ}{}_{48}$ have different signs. Such a semiactive damping is described in Patent Application EP,A,-262886. In a semiactive damping only when $z_{48}$ and $z^{\circ}{}_{48}$ have opposite signs, this entails that the need for measuring $y_2^{\circ}$ or $Y^{\circ}$ disappears, which measurement quantity is otherwise required for controlling according to equation (10) in the active application. The semiactive damping then takes place only in the half-periods of the oscillation cycle where $z_{48}$ and $z^{\circ}{}_{48}$ have opposite signs. The damping is then overcompensated for by a factor approaching 1.3, preferably somewhere between 1.0 and 1.2. If the control according to equation (10) is effected by detection of $y_2^{\circ}$, the time-lag $dT$ between the $y_2^{\circ}$signal and $z_{48}^{\circ}$signal must satisfy the condition:

$$\omega_2 * dT << 1.$$

When $\omega_2$ is approximately equal to $2 * 3{,}14 * 10$, for the interesting wheel-hop frequency about 10 Hz, will be $$dT << 16 \text{ msek}.$$

The requirement on the time-lag dt may be derived if the control is effected through $y_2$ so that $$F_7 = F_0 + k_{48}*z_{48} + m_2*y_2^{\circ\circ}$$

and it is assumed that the delay by measurement of $y_2^{\circ\circ}$ is dT, the following solution of the movement equations will be obtained:

$$m_2*dT*y_2^{\circ\circ\circ} + k_8*y_2 = k_8*Y$$

and $$m_{40}*y_{40}^{\circ\circ} = -m_2*(y_2^{\circ\circ} - dT*y_2^{\circ\circ\circ})$$

If the disturbance function Y is allocated the harmonic disturbance function:

$$Y = Y_0*e^{i\omega t}$$

the following relationship will be obtained with $$\omega_2^2 = k_8/m_2:$$

$$y_2 = (1/(1-(\omega/\omega_2)^2 *i\omega dT))*Y_0*e^{i\omega t}$$

$$y_{40} = -m_2/m_{40}*(1-i\omega dT)*y_2$$

If $\omega*dT << 1$ the previous solution will be obtained within the interesting frequency range, viz.

$$y_2 = Y$$

$$y_{40} = -m_2/m_{40}*y_2.$$

The operative laws show that an optimum springing can be obtained in the active application which is not afflicted by impact of wheel-hop up to the body and which has optimum road-holding properties. The wheel will follow the road surface and the casing of the damper will move in response to the mass relationship between wheel and damper casing. Since the casing of the damper is employed at the same time as a resonance mass which, together with a spring interconnecting the casing of the damper with the wheel, forms a resonance system harmonically adjusted to the wheel, there will be obtained an efficient suspension system which, without extra resonance damping masses and unduly complex transducers, can be controlled actively such that optimum springing in respect of both comfort and road-holding properties will be obtained.

The principle of utilizing the casing of the damper as a resonance mass in a resonance system harmonically adjusted to the wheel can also be employed in both passive and semiactive control of the damper in respect of wheel-hop. Also in these variations, a compact damper design will be obtained which has superior insulation properties of the disturbance impulses of the wheel up to the body.

I claim:

1. A suspension system which is disposed between a first sprung mass and a second unsprung mass for reducing transfer of disturbing impulses from the second unsprung mass to the first sprung mass, the suspension system comprising:

first spring means for resiliently interconnecting the first and second masses in a force transmitting relationship;

a damping cylinder having a casing connected in parallel with the first spring means between the first and second masses;

second spring means for resiliently interconnecting the casing of the damping cylinder with the second unsprung mass;

the cylinder including first and second pistons having respective piston rods for connecting the first and second pistons to the first and second masses, respectively, the first and second pistons dividing the damping cylinder into first, second and third chambers, each of which accommodates damping fluid; and flow actuating means for controlling replenishment and evacuation of damping fluid in each of the first, second and third chambers.

2. The suspension system of claim 1, wherein the casing of the cylinder includes first and second end walls, the cylinder has a longitudinal axis, the first and second pistons have respective upper and lower surfaces, the first chamber of the damping cylinder is defined in the longitudinal direction by the first end wall and the upper surface of the first piston; the second chamber of the damping cylinder is defined in a longitudinal direction by the lower surface of the first piston and the upper surface of the second piston, and the third chamber of the damping cylinder is defined by the lower surface of the second piston and the second end wall.

3. The suspension system of claim 2, further including means for flow interconnecting the first chamber and the third chamber, the flow interconnecting means including a throttle for damping the flow.

4. The suspension system of claim 3, wherein the flow actuating means includes a throttle and further including control means for controlling the throttle.

5. The suspension system of claim 4, further including a sensor for detecting movement of the unsprung mass, the sensor emitting an output signal corresponding to said movement, and wherein said control means is responsive to the output signal for controlling the operation of the throttle.

6. The suspension system of claim 5, wherein the sensor comprises an accelerometer disposed on the second unsprung mass.

7. The suspension system of claim 2, wherein the first piston includes a throttle which flow connects the first chamber and the second chamber.

8. The suspension system of claim 7, wherein the flow actuating means includes a throttle and further including control means for controlling the throttle.

9. The suspension system of claim 8, further including a sensor for detecting relative movement between the sprung mass and the unsprung mass, said sensor emitting an output signal corresponding to the relative movement between the masses and wherein the control means is responsive to the output signal for controlling the operation of the throttle.

10. The suspension system of claim 6, wherein the sensor comprises a position indicator.

11. The suspension system of claim 2, wherein the flow actuating means includes first and second regulators for respectively controlling the replenishment and evacuation of damping fluid in the first and second chambers.

12. The suspension system of claim 2, wherein the flow actuating means includes respective first, second and third regulators for controlling the replenishment and evacuation of damping fluid in the first, second and third chambers.

13. The suspension system of claim 12, further including a sensor for detecting relative movement between the sprung mass and the unsprung mass, the sensor emitting an output signal corresponding to the relative movement between the masses, means for connecting the output signal from the sensor to the control means, the control means emitting a control signal in response to the output signal of the sensor for operating the first and second regulators to control the replenishment and evacuation of the first and second chambers in response to the output signal.

14. The suspension system of claim 13, wherein the sensor comprises a position indicator.

15. The suspension system of claim 12, further including a sensor for detecting movement of the unsprung mass, the sensor emitting an output signal corresponding to the movement, means for connecting the output signal from the sensor to the control means, the control means operating the first and third regulators to control replenishment and evacuation of the damping fluid of the first and second chambers in response to the output signal.

16. The suspension system of claim 15, wherein the sensor comprises an accelerometer disposed on the second unsprung mass.

17. The suspension system of claim 2, further including third spring means for connecting the piston rod of the first piston to the first unsprung mass.

18. The suspension system of claim 2, further including fourth spring means for providing external disturbing impulses to the second unsprung mass; and wherein the casing of the damping cylinder constitutes a third mass, the second spring means has a spring constant and the fourth spring means has a spring constant; and wherein the third mass, the spring constant of the second spring means, the unsprung mass and the spring constant of the fourth spring means are so related to each other that they form a resonant damping System for movement of the unsprung mass.

19. The suspension system of claim 18, wherein the fourth spring means comprises the tires of the vehicle.

20. The suspension system of claim 19, wherein the ratio of the spring constant of the second spring means to the third mass is substantially equal to the ratio of the spring constant of the fourth spring means to the unsprung mass.

21. A method for regulating a suspension system which is disposed between a first sprung mass and a second unsprung mass to reduce transfer of disturbing impulses from the second unsprung mass to the first sprung mass, the suspension system including first spring means for resiliently interconnecting the first and second masses in a force transmitting relationship, a damping cylinder having a casing connected in parallel with the first spring means between the first and second masses, the cylinder being divided into a plurality of chambers accommodating damping fluid, and flow actuating means for controlling replenishment and evacuation of damping fluid in each of the plurality of chambers, the method comprising:
providing first and second pistons in the damping cylinder for transmitting the movement of the first sprung mass and the second unsprung mass to the damping cylinder; and
controlling the motion of the casing as a function of the motion of the second unsprung mass in such a way that the mass of the casing is used as a resonance mass in a resonance system harmonically adjusted to the unsprung mass in order to resonantly damping motion of the unsprung mass independently of said first spring means.

22. The method of claim 21, wherein the casing of the cylinder has a longitudinal axis, the first and second pistons have respective upper and lower surfaces, a first chamber of the damping cylinder is defined in the longitudinal direction by a first wall and the upper surface of the first piston, a second chamber of the damping cylinder is defined in a longitudinal direction by the lower surface of the first piston and the upper surface of the second piston, and a third chamber of the damping cylinder is defined by the lower surface of the second piston and a second end wall and which includes the step of regulating the damping fluid in the first and second chambers to damp the movement between the unsprung mass and the sprung mass.

23. The method of claim 21, including regulating the damping fluid in the first chamber and third chamber to damp the movement of the unsprung mass.

24. The method of claim 22, including regulating the first piston such that a net force thereof substantially corresponds to a force from the first spring means but is counter directed thereto.

25. The method of claim 23, including regulating the second piston such that a net force thereof substantially corresponds to a mass force from the movement of the unsprung mass in direction and magnitude.

26. The method of claim 25, wherein the net force of the second piston takes into account an action of the casing on the movement of the unsprung mass via the second spring means connected between the casing and the unsprung mass.

27. The method of claim 22, wherein the regulation is effected by flow communication between the first and second chambers across a throttle.

28. The method of claim 27, which comprises controlling the operation of the throttle in dependence upon the movement between the unsprung mass and the sprung mass.

29. The method of claim 28, wherein the throttle is controlled such that damping is provided when the product of a relative position of the unsprung mass and the sprung mass and a relative speed thereof is negative and no damping is provided when such product is positive.

30. The method of claim 29, wherein the damping and the force of the first spring means have respective amplitudes and the amplitude of the damping is between 1 and 1.2 of the amplitude of the amplitude of the force of the first spring means.

31. The method of claim 23, wherein regulation is effected by flow communication between the first and third chambers across a throttle.

32. The method of claim 31, which comprises controlling the throttle in dependence upon the movement of the unsprung mass.

33. The method of claim 32, wherein the damping cylinder has a longitudinal axis and the regulation is a function of acceleration of the unsprung mass in a direction substantially parallel to the longitudinal axis of the damping cylinder.

34. The method of claim 23, wherein the casing of the cylinder is connected to the unsprung mass via a second spring having a spring constant and the unsprung mass receives external disturbing impulses across third spring means having a spring constant, which comprises the step of: selecting the mass of the damping cylinder, the spring constant of the second spring, the mass of the unsprung mass and the spring constant of the third spring means such that the ratio of the mass of the damping cylinder to the spring constant of the second spring is substantially equal to the ratio of the unsprung mass to the spring constant of the third spring means.

35. The method of claim 22, wherein the disturbing impulses have certain frequencies and the regulation is activated at a frequency of about 1 Hz.

36. The method of claim 35, wherein regulation is activated at a frequency range of between 0.5 and 3 Hz.

37. The method of claim 23, wherein the disturbing impulses have certain frequencies and the regulation is activated at a frequency proximal to the natural resonance frequency of the unsprung mass.

38. The method of claim 37, wherein the regulation is activated at a frequency range of between 5 and 20 Hz.

39. The method of claim 38, the regulation is activated at a frequency of about 10 Hz.

* * * * *